Figure 1:
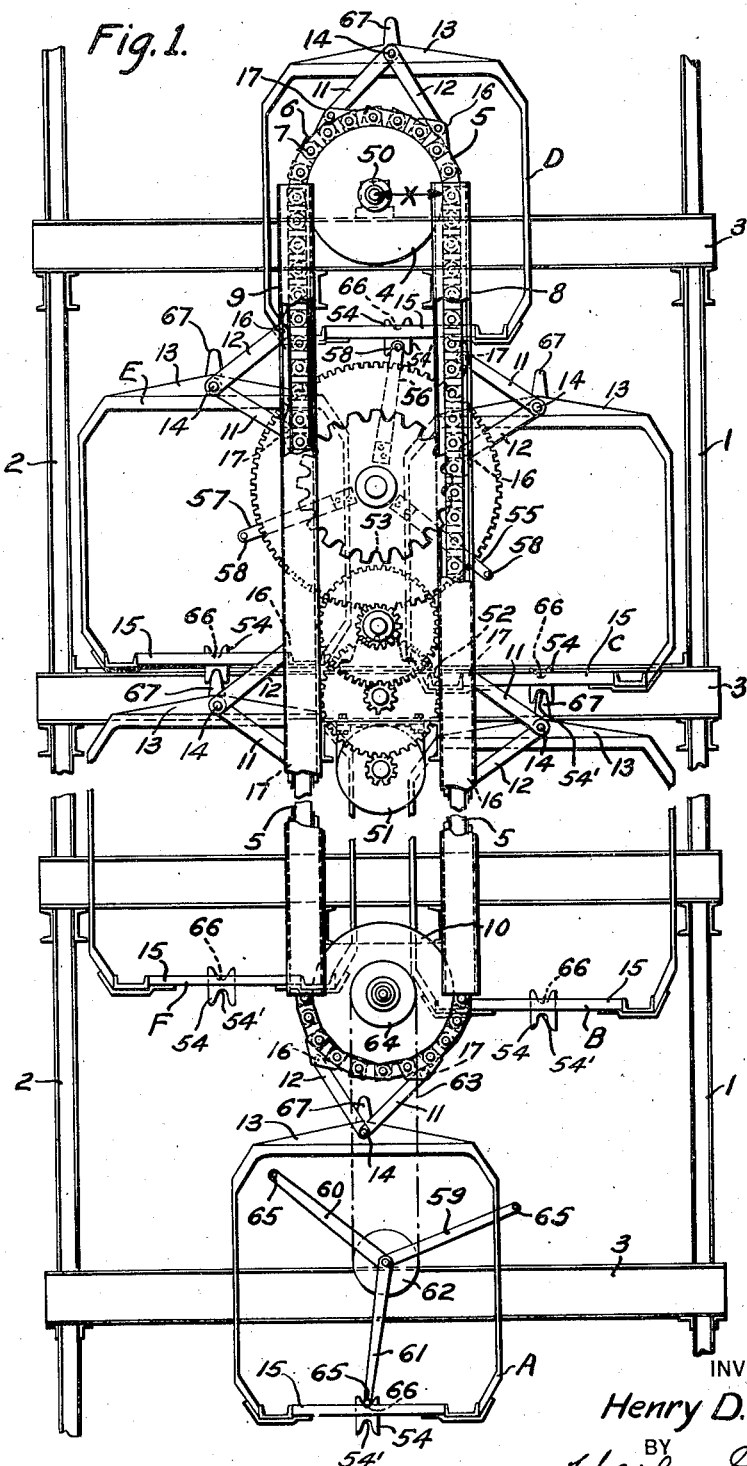

May 24, 1932.  H. D. JAMES  1,859,874
AUTOMOBILE STORAGE ELEVATOR
Filed Jan. 5, 1929  5 Sheets-Sheet 1

INVENTOR
Henry D. James,
BY
Wesley G. Carr
ATTORNEY

May 24, 1932. H. D. JAMES 1,859,874
AUTOMOBILE STORAGE ELEVATOR
Filed Jan. 5, 1929 5 Sheets-Sheet 2
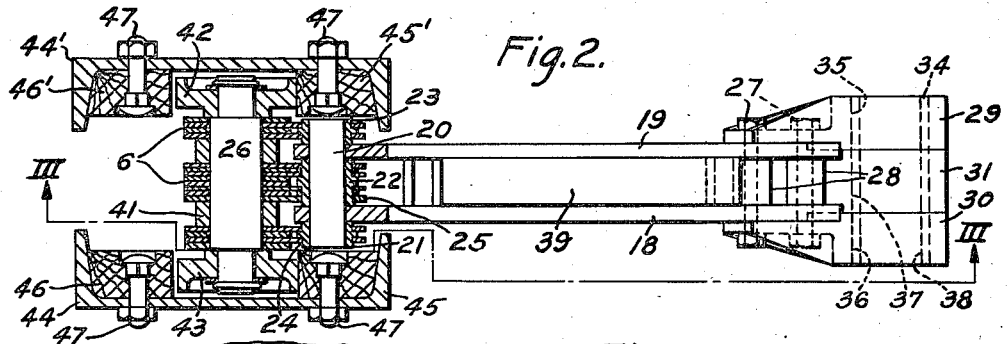
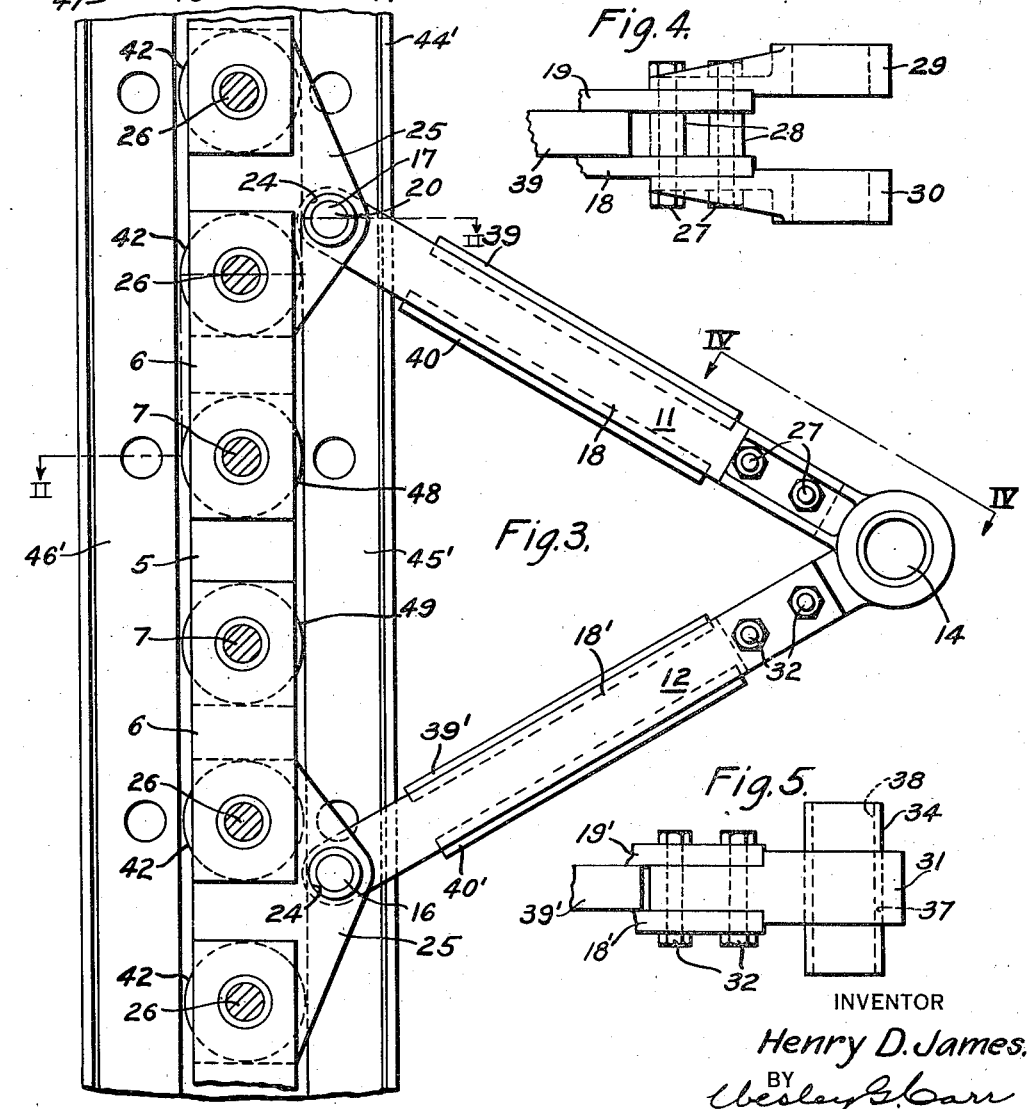
INVENTOR
Henry D. James,
BY
ATTORNEY May 24, 1932. H. D. JAMES 1,859,874
AUTOMOBILE STORAGE ELEVATOR
Filed Jan. 5, 1929  5 Sheets-Sheet 3
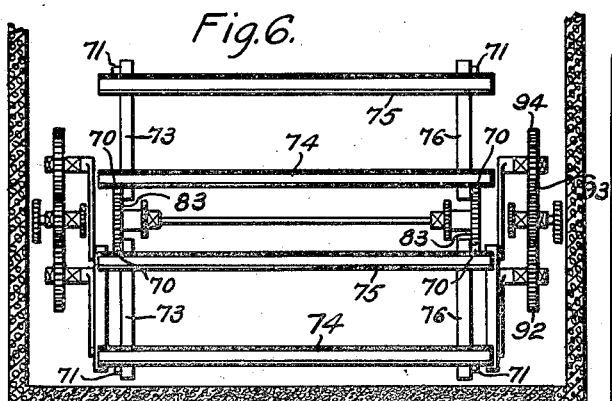
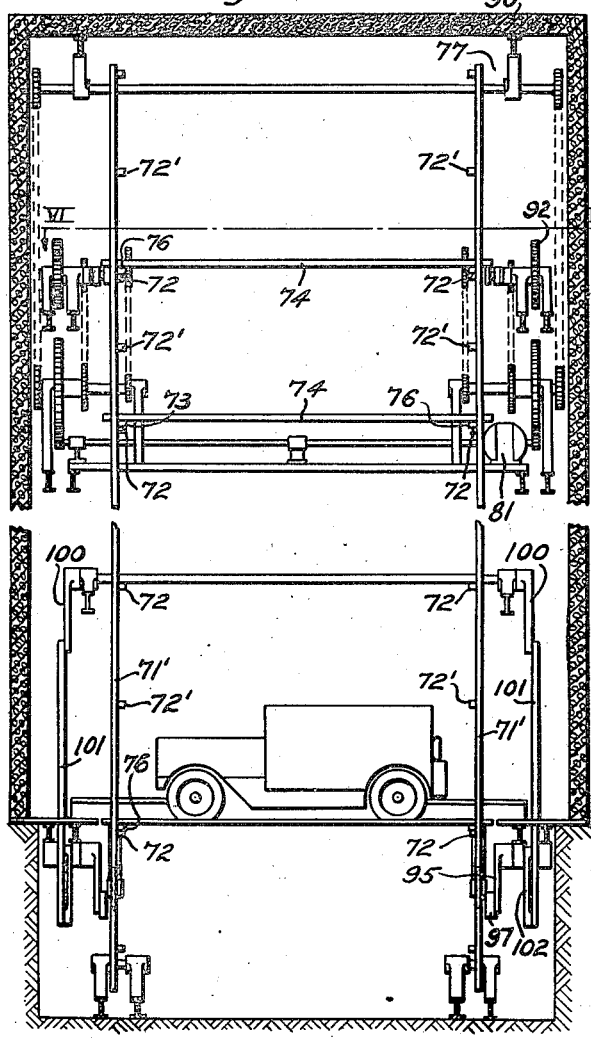
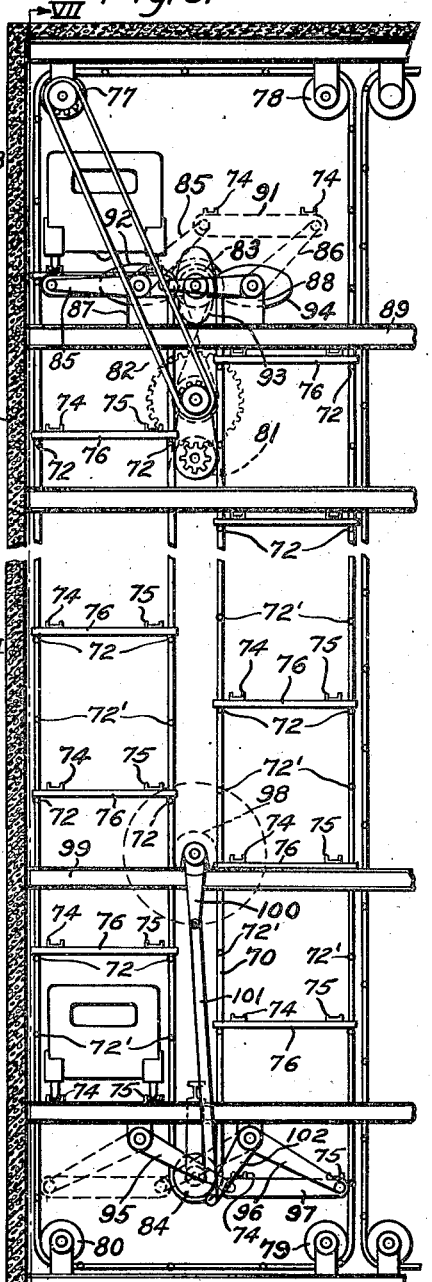
INVENTOR
Henry D. James.
BY
Wesley G. Carr
ATTORNEY

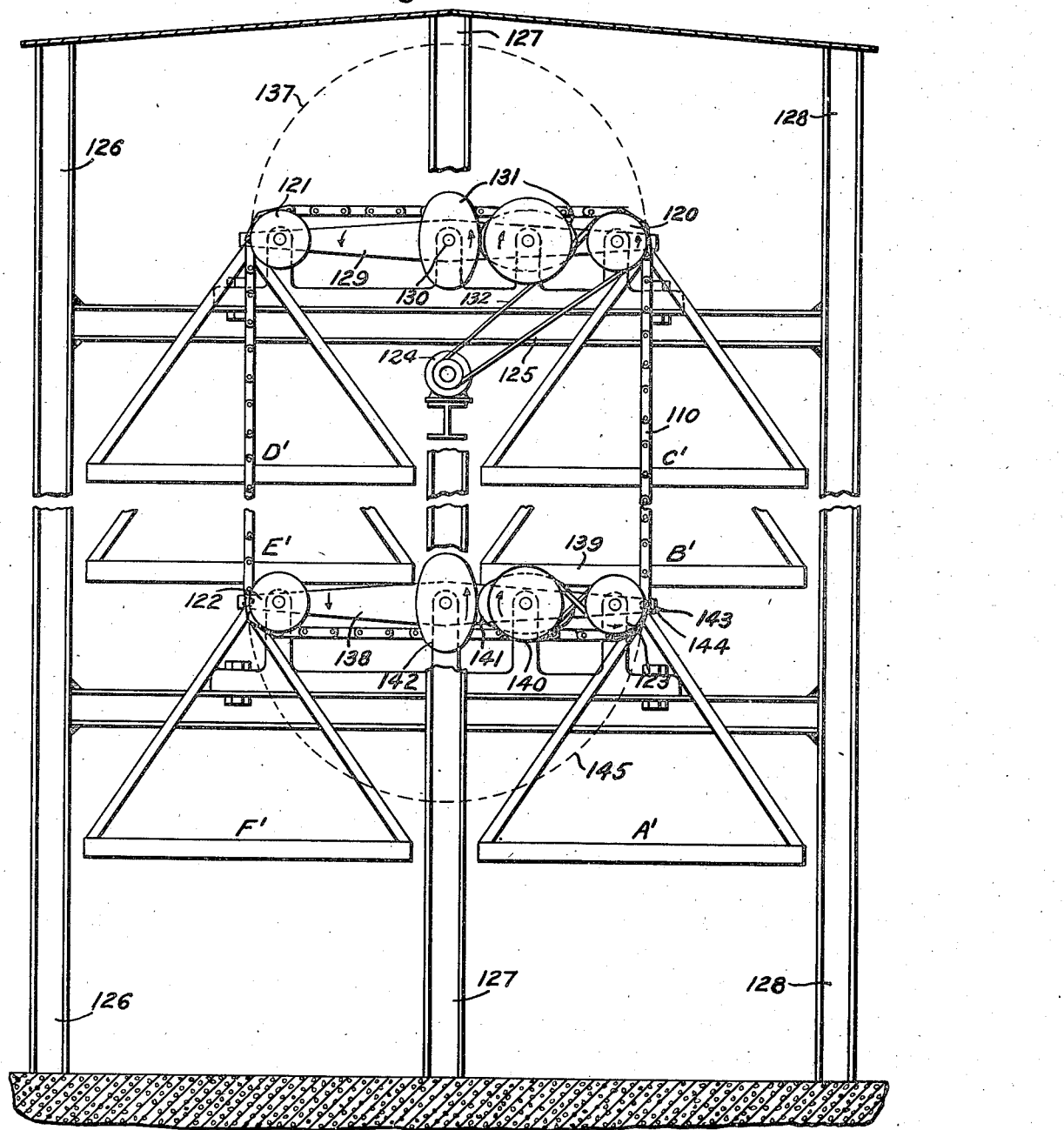

May 24, 1932.  H. D. JAMES  1,859,874
AUTOMOBILE STORAGE ELEVATOR
Filed Jan. 5, 1929    5 Sheets-Sheet 5

INVENTOR
Henry D. James
BY
ATTORNEY

Patented May 24, 1932

1,859,874

UNITED STATES PATENT OFFICE

HENRY D. JAMES, OF EDGEWOOD, PENNSYLVANIA, ASSIGNOR TO WESTINGHOUSE ELECTRIC & MANUFACTURING COMPANY, A CORPORATION OF PENNSYLVANIA

AUTOMOBILE STORAGE ELEVATOR

Application filed January 5, 1929. Serial No. 330,455.

My invention relates to storage devices and has particular reference to storage systems including movable conveyors.

In order to solve the problem of automobile parking in large cities in which facilities for parking automobiles are limited, it has been proposed to utilize vertical storage systems for the purpose of storing the greatest number of automobiles upon the smallest ground area. Certain of the systems proposed included a storage structure comprising, in effect, two vertical columns of load receptacles or automobile-carrying platforms or cages arranged adjacent to each other. In order to receive and store the automobiles for which the system is to be utilized, suitable power mechanism is arranged to simultaneously move the cages or receptacles in one column upwardly and the cages in the adjacent column downwardly and to transfer the uppermost cage from one column to the top of the adjacent column and the lowermost cage from the second column to the bottom of the first column. In other words, the power mechanism moves the entire system of cages in a circuitous path past any selected level which is to be utilized as the loading and unloading point for the system.

While the proposed systems increase the efficiency of automobile storage, it is observed that the greatest amount of space is not effectively utilized in any of the systems heretofore proposed. This is particularly true of those systems which include attaching the cages to an endless chain, which chain acts both as a motive means for moving the cages and as a guiding means for guiding the cages in their movements through the circuitous path.

With systems of the endless-chain type, it has heretofore been necessary to space the cages lengthwise on the chain by a sufficient distance to permit the cages, in passing over the guide sheaves or sprocket wheels at the top and the bottom of the columns, to clear the cages ascending or descending in the vertical columns. Such spacing, under the best of conditions, will attain a value of approximately one-fourth of the total height of a cage necessary to accommodate an automobile. Hence, in any system of this type, one-fourth of the volume of the storage structure is wasted to provide the necessary clearance between the cages or receptacles.

To eliminate this waste-space, I propose to use a system which includes mechanism for moving the uppermost cage from one column to the top of the adjacent column at a speed greater than the speed of the cages moving in the vertical columns, or, in other words, I propose that the shifting of the cages from the one to the other column shall be made at a sufficiently rapid rate to obviate the necessity of spacing the cages along the chain at greater distances than are actually required to accommodate the height of an automobile.

My system will be described with reference to the accompanying drawings, wherein, Figure 1 is a view, in side elevation, of a suitable system utilizing a rapid movement of the cages at the top and at the bottom of the columns, Fig. 2 is a detail view, partially in section, of one of the arms utilized to attach the cages to the conveyor chain and illustrates the guiding devices for guiding the chain and the cage in their movements, Fig. 3 is a detail view, in side elevation, of a completely assembled attaching arm, Fig. 4 is a detail plan view of the outer end of one of the attaching arms, while Fig. 5 is a detail plan view of the other attaching arm shown in Fig. 3.

Figure 10:
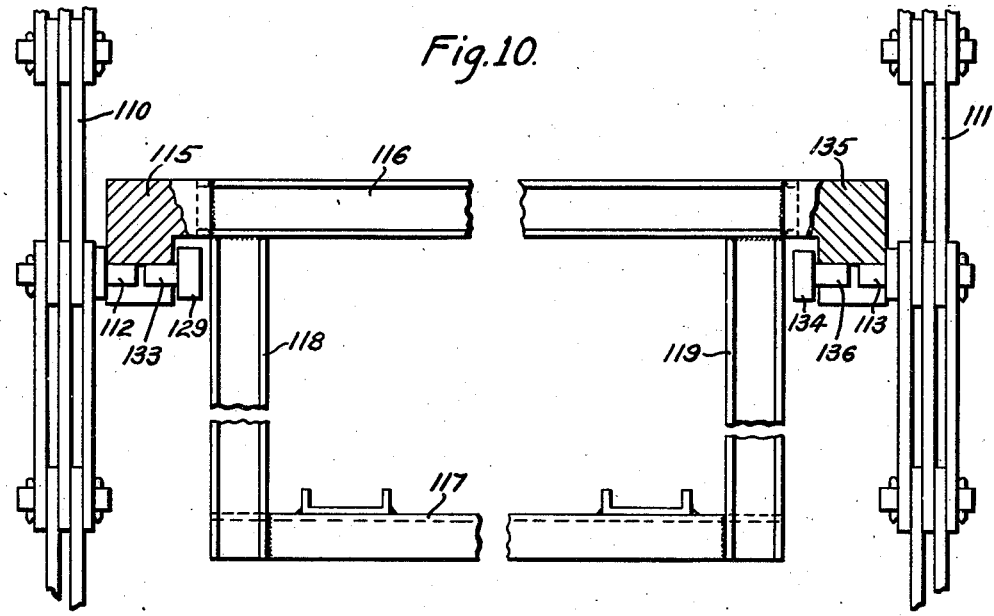
Figure 11:
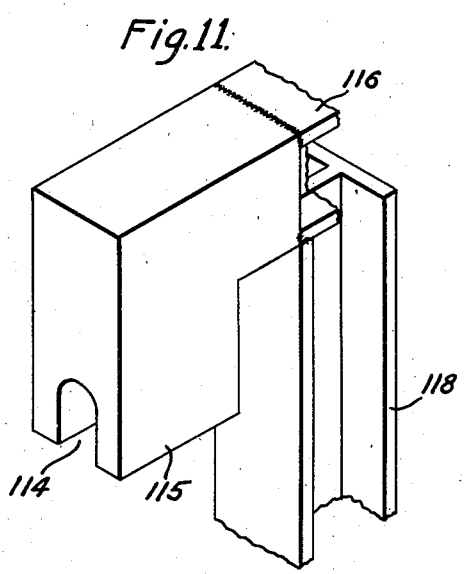

Fig. 6 is a top plan view of a modified form of my invention, illustrating another system for rapidly transferring the cages from the one to the other column at the top and bottom of the columns, Fig. 7 is a view, in front elevation, of the modified system shown in Fig. 6, Fig. 8 is a view, in side elevation, of the modified system shown in Fig. 6, Fig. 9 is a view, in front elevation, showing a further modified form of my invention and illustrating another system for rapidly transferring the cages at the tops and bottoms of the columns, Fig. 10 is a broken view, in side elevation, partly in section, illustrating details of the mechanical devices for supporting and transferring the platforms, and Fig. 11 is a detail perspective view, showing details of the attachment between the conveyor chain and the automobile-carrying platform or receptacle utilized in the modification shown in Figures 9 and 10.

Referring to the drawings, I have illustrated, in Fig. 1, a storage system of the endless-chain-conveyor type to be utilized for storing automobiles which consists of a suitable structural steel supporting structure illustrated as comprising the vertical columns 1 and 2, suitably braced by means of cross beams 3, upon the uppermost of which is mounted a chain-supporting sprocket 4, over which passes a suitable chain 5, constructed of a plurality of chain links 6, interconnected by means of pins 7. The chain 5 extends over the sprocket 4 and thence downwardly, within suitable guiding channels 8 and 9, to the lowermost portion of the supporting structure, whence it passes around a lower sprocket 10 and thence upwardly to sprocket 4. It will be observed that the chain 5, constructed as illustrated, constitutes an endless carrier upon which may be suspended a plurality of load receptacles or storage cages, six of which are illustrated and designated by the reference characters A, B, C, D, E and F. Each of the load receptacles or cages is attached to the chain by means of a pair of attaching arms 11 and 12, pivotally secured to the top frame 13 of the associated cage by means of a pivot-connection 14, whence the arms extend in a plane at right angles to the plane of movement of the chain 5 but at angular relation to each other, to engage the chain 5 at points 16 and 17 that are spaced vertically from each other on the chain.

The foregoing construction constitutes substantially a pair of vertical columns of cages, the columns being interconnected at the upper and lower end, respectively, thus defining a path of movement for the cages.

The attaching arm 11 comprises side members 18 and 19 secured in spaced relation upon a pin 20, at one end of the respective arms, which pin is pivotally secured within bushings 21, 22 and 23 received in openings 24 in each of a plurality of attaching links 25 constituting links in the chain structure 5. Links 25 are, in turn, attached to links 6 of the chain 5 by means of pins 26 that are identical in construction with pins 7 which are utilized to connect adjacent links 6 of the chain 5.

The right-hand ends of members 18 and 19 of the arm 11 have attached thereto, by means of bolts 27 and spacing sleeves 28, a pair of bearing members 29 and 30, the assembled structure constituting a bifurcated end for the arm 11. An end piece 31, which is secured between side members 18' and 19' (constituting portions of the supporting or attaching arm 12) by means of suitable bolts 32 and 33, is insertable within the bifurcated end of arm 11. To constitute a bearing member about which the end pieces 29 and 30 and the end pieces 31 may move pivotally with reference to each other, a bushing 34 extends through the openings 35, 36 and 37 in each of the end pieces, respectively. Within the opening 38, in the bushing 34, the cage-securing pin 14 may be received, this structure thereby constituting a pivotal suspension for the top frame 13. In order to brace the arm 11, suitable bracing plates 39 and 40 are secured in any suitable manner, as by welding, to the upper and lower sides of the side pieces 18 and 19, the assembled structure constituting, in effect, an arm of square or rectangular cross section. Similarly, bracing plates 39' and 40' are secured to the side pieces 18' and 19' of the arm 12 to perform a similar office for these arms.

While I have illustrated the pin 20 and special links 25 as a means for attaching the supporting arms 11 and 12 to the chain, it should be observed that the arms 11 and 12 may be attached directly to the pins 26, if desired to thereby constitute the interconnecting means for the chain links 6, thereby obviating the necessity for providing links of different types in the chain structure.

Referring particularly to Fig. 2, it will be observed that the pin 26, which secures links 25 to chain links 6, has suitable roller-bushings 41 mounted thereon which act as spacers for dividing the main body of the chain structure 5 into three sections. The left-hand ends of side members 18 and 19 are secured to the pin 20 on equal and opposite sides of the center of the pin, to thereby equalize the distribution of the load on this pin. The outer ends of the pins 26 have roller members 42 and 43, respectively, mounted thereon.

On each side of the chain 5, is mounted a channel member 44, preferably constructed of a structural-steel channel, of the usual type, the channel illustrated in the lowermost position in Fig. 2 being designated by the reference character 44, while that at the uppermost portion of this figure is designated by the reference character 44'. Secured within each of the channel members are a pair of tracks 45 and 46 respectively, suitably secured to the channel 44 by means of bolts 47 and constituting a double track to engage outer surfaces of the roller 43. In a similar manner, track members 45' and 46' constitute a double track upon which the roller 42 may operate. The track members 45 and 46 are preferably constructed of vibrationless material, such as wood or fibre, for the purpose of reducing the noise occasioned by the rollers 42 and 43 riding thereon in the normal movements of the chain 5 and the cages A, B, C, etc. The described construction of rollers and guides acts as a bracing means for withstanding side thrusts occasioned by the load in both horizontal and vertical planes.

While only the chain-attaching links, pins and rollers are described for the arm 11, it is to be understood that a similar structure is provided for attaching the left-hand end of arm 12 to the chain 5 to constitute a rolling guided support for this arm. Suitable rollers 48 and 49 may be provided upon each of the pins 7 that are utilized to interconnect links 6 in the chain structure, though, if desired, these additional rollers may be dispensed with.

Referring again to Fig. 1, it will be observed that the arms 11 and 12 and the vertically extending portion of the chain 5, constitute a triangle having its base along the axis of the chain 5. I propose to construct this triangle with an altitude equal to the radius of the guide sheave or sprocket 4. It will be observed, therefore, that the movement of the cages through the vertical portion of the path defined by the chain 5 will be at a speed proportional to the radius X of the sheave or sprocket 4, but, when the triangular attaching device 11, 12 passes over the sheave or sprocket 4, the attaching pin 14 will move in the arc of a circle, the radius of which is twice the radius of the sheave 4. Hence, the cage will be transferred through a horizontal movement from the top of the one column to the top of the adjacent column at a varying rate of speed, which variation starts as the pin 14 passes the level of the bearing 50 for the sheave 4 and will gradually accelerate until, at the time the pin 14 is in vertical alignment with the bearing 50, the horizontal speed of movement of the pin 14 and the cage attached thereto will be twice the speed of the sheave 4, and, consequently, twice the speed with which the next cage is being moved vertically toward the sheave 4. Thereafter, as the pin 14 moves from vertical alignment with the bearing 50 to a position on a horizontal level with the bearing 50, the horizontal speed of movement of the cage will be gradually decelerated until, as the cage begins its vertical descent, the pin 14 and the attached cage are moving at the normal speed determined by the radius X of the sheave 4.

It will be observed that a similar action will take place at the lowermost portion of the structure when the pin 14 for any cage passes through the arc of the circle around the lower sheave or sprocket 10. Hence, the mechanism just described constitutes a means for rapidly transferring the cages from one vertical column to the other. By constructing the cages and their attaching devices in accordance with the description set forth, it will be observed that, through the vertical portions of the movements of the cages, they may be secured upon the chain in close relation, there being substantially no waste space between the top frame 13 of the one cage and the lower frame 15 of the cage mounted just above it. Hence, by the elimination of this waste space, a greater number of automobiles may be stored within a given vertical height of storage structure or housing.

While the particular means for applying motive power to the chain 5 is not material to my invention, I prefer that the driving mechanism shall be similar to that illustrated in my copending application, Serial No. 265,011, filed March 27, 1928 and assigned to the Westinghouse Electric & Manufacturing Company, which drive comprises a suitable motor 51, driving through suitable reduction gearing 52, a sprocket 53, the teeth of which engage the roller bushings 41 upon the pins 6 and 26, respectively, to thereby drive the chain upwardly upon one side of the sprocket 53 and downwardly upon the opposite side of the sprocket.

It will be observed, however, that, due to the accelerated motion of the cages, as they move from one column to the other, the inertia of the cages opposed to the change from the vertical movement to the horizontal movement will have a tendency to make the cages swing upon their attaching pivot 14 and, as will be the case when these cages are loaded with such weights as are present in the contemplated use of this device as an automobile-storage structure, such swinging movement is undesirable, if not extremely dangerous. For this reason, I have provided mechanism for guiding the lowermost portions of the cages during that portion of their movement which consists of transfer of the cage from one column to the next. This guiding mechanism comprises a cam shoe 54 secured to the lowermost portion 15 of the frame-work of each of the cages A, B, C, etc., to be engaged by any one of the three arms 55, 56 and 57 rotatable with the driving sprocket 53. The outer end of each of the arms 55, 56, 57 is provided with a suitable pin 58 for engagement with a depression 54' in the bottom of each of the cam shoes 54.

It will be observed, from an inspection of Fig. 1, that the radius of the sprocket 53 is the same as the radius of the sheave 4, while the arms 55, 56 and 57 are each constructed of such length that the pins 58 lie at a distance from the axis of rotation of the gear 53, equal to twice the radius of the sprocket. Hence, the pin 58 on any one of the arms 55, 56, 57 will move in synchronism with the attaching pin 14 for the top frame of the cage as the pin 14 moves over the circular path concentric with the sheave 4. By suitably arranging the location of each of the arms 55, 56 and 57, with respect to the location of the attaching arms 11 and 12, and with reference to the chain 5, it follows that, as the pin 14 starts through its semicircular path over the sheave 4, one of the pins 58 on the arms 55, 56, 57 will engage the cam shoe at the lower portion of the corresponding cage. Hence, the lower end of the cage will be guided in exact synchronism with the movements of the upper end of the cage during the transfer period.

In a similar manner, a plurality of arms 59, 60, 61, are mounted upon a suitable sprocket 62, which is driven by means of any suitable connection, such as a chain 63, from any moving part of the chain 5 or its driving mechanism (illustrated herein as comprising a sprocket 64 rotatable with the lower chain sheave or sprocket 10). The arms 59, 60 and 61 may be moved through a circular path corresponding to the arcuate movement of the pins 14 as the cages pass from one vertical column to the other at the lowermost portion of their travel. Each of the arms 59, 60, 61 is provided with a pin 65 corresponding to the pins 58 described with reference to arms 55, 56, 57, for the purpose of engaging a depression 66 in the top of cam shoes 54 to thereby guide the cages through the transfer movement at the lower portion of the storage structure.

In the center of each top frame 13, an upstanding lug 67 is secured in such relation as to engage the lower depression 54' in the cam piece 54 of the cage next above it during the movements of the cages through the vertical portions of their travel. The inter-engagement of lug 67 and cam 54 prevents swinging of the cages during the vertical movement.

From the above description, it will be apparent that the cages will be moved vertically at one speed, but will be moved horizontally at a greater speed, the speeds being so arranged as to permit the transfer of the cages from one column to the next without interference with each other. Moreover, it should be noted that the change of speed from that of vertical to that of horizontal movement is gradual, presenting, therefore, the ideal condition of rapidly transferring the cages from one column to the next.

In Figs. 6, 7 and 8, I have illustrated a modified form of the rapid transfer mechanism. Referring to Fig. 8, I have illustrated a conveyor system comprising a pair of endless chains 70 and 71 to engage one end of each of a plurality of load receptacles, while another pair of chains is assumed to be provided for the opposite end of the load receptacles (only one of which chains is illustrated in Fig. 7 and is designated by the reference character 71'). The chains are provided at spaced intervals thereon, equal to the maximum height of an automobile, with a plurality of projecting pins 72 for engaging the end members 73 of the load receptacles. The load receptacles may be constructed in skeleton form and may comprise a pair of channel members 74 and 75 secured in parallel relation to each other by means of end members 73 and 76. It is to be understood that suitable bracing (not shown) may be utilized to strengthen the construction of the load receptacles.

From an inspection of Fig. 8, it will be apparent that chain 71 extends in an endless path over four sheaves or sprockets 77, 78, 79 and 80 and may be suitably driven in any well known manner, as by means of a motor 81 geared to one of the sprockets 77 in any well known manner, illustrated herein as comprising chain 82. In a similar manner, chain 70 may also be suitably driven in synchronism with the movements of chain 71 by gearing chain 70 to motor 81, in a well known manner. Chain 70 extends, however, through a relatively short endless path defined by upper sprocket sheave 83 and a lower sprocket or sheave 84.

From the above description, it will be observed that I have devised an endless-chain conveyor system which will include a plurality of load receptacles detachably secured to a pair of synchronously moving chains in such manner as to constitute two vertically-extending parallel columns of movable platforms, upon which automobiles to be parked or stored may be driven and lifted in one of the columns and simultaneously lowered in the other of said columns. As each of the load receptacles approaches the uppermost limit of travel, I have arranged that the receptacles will be lifted off the chains and transferred rapidly across the upper portion of the storage structure and will be set down upon the chains in a position in that column corresponding to its position in the column from which it has just been transferred.

One form of mechanism for accomplishing this result is illustrated as comprising a pair of arms 85 and 86 respectively mounted in bearing members 87 and 88, suitably secured to any lateral portion 89 of the supporting or housing structure 90. The ends of the arms 85 and 86, opposite to the bearings 87 and 88, are pivotally attached to a cross arm 91 which extends in such relation to the load receptacles as will permit the ends of the channel members 74 to rest upon this cross arm when the receptacle is to be transferred.

By means of any suitable gearing I achieve a gradual acceleration and deceleration during the movement of the arms 85 and 86 through a semi-circular path, illustrated herein as eccentric gears 92, 93 and 94, driven in sychronism with the movements of the chains 70 and 71. The load receptacles will be lifted from the chains 70, 71 at a speed approximately the same as the speed of movement of the chains, and the platforms will then be accelerated to any desired speed and again decelerated and set down upon the chains which, at this time, are moving downwardly in the other column. The transfer arm structures 85, 86 and 91, will then continue to travel through the remainder of the circular path to be brought into a position under the next succeeding load receptacle in the ascending column. This operation is repeated as each of the load receptacles arrives at the uppermost limit of movement in the ascending column.

It should be remembered, however, that, irrespective of the speed of movement of the load receptacles through the horizontal or semi-circular path, the beginning and the end of the transfer cycle should be so synchronized with the movements of the chain that one of the pins 72 on each of the chains will have arrived in the descending column at just the right time to receive the platform to be set down thereon.

To accomplish a similar rapid transfer of the cages at the lowermost portion of the conveyor system, I have provided a similar set of transfer arms 95 and 96 connected by means of a cross arm 97 and oscillatable through a semi-circular path by means of any suitable driving mechanism which is synchronized with the movements of the chains 70 and 71. I have illustrated this driving mechanism as comprising a sprocket 98 rotatably mounted upon a member 99 constituting a portion of the housing or supporting structure 90 and having keyed thereto a crank arm 100 connected by means of connecting rod 101 to an arm 102 keyed or otherwise suitably secured to the transfer arm 96, and the arm 102 constituting, in effect, a bell-crank lever in such manner that rotation of the sprocket 98 will cause the arm 95 and 96 to reciprocate through the path described above to perform the office of transferring the load receptacles at the lowermost portion of their travel.

It will be observed that, when the cross arm 97 is swung upwardly under the load receptacle in the descending column of the conveyor, to engage the load receptacle, it will lift the same off of the supporting pins. Then, upon initiation of the downward movement of the transfer arms 95, 96 and 97, the arm 97 will describe an arcuate path for moving the load receptacle somewhat to the right of its present position upon the chain. At this time, however, the chain 71 will have been moved downwardly so that it will remove the pin 72, upon which the cage has previously been resting, out of this arcuate path described by the arms 95 and 96.

At the same time, the chain 70 will have moved directly around the lower sheave 84, hence moving the pin on this chain out of the arcuate path of the transfer mechanism. At the end of the transfer movement, however, the load receptacle will be moved into the ascending column just prior to the time at which supporting pins will arrive in the position necessary to lift the load receptacle and hence, upon reversal of movement of the transfer mechanism, the receptacle will be gently placed upon the pins 72 to begin its vertical travel under the influence of the chains 70 and 71.

It should be observed that the average speed of motion of the cages during the transfer from one column to the other, in the form of the device illustrated in Figs. 6, 7 and 8, must be at least twice the speed of movement of the chains 70 and 71, and, for this reason, it is necessary to provide an additional set of supporting pins 72' located substantially centrally on the chains 70 and 71 between the pins 72 on the respective chains. With this type of construction, it will be observed that the platforms 73 will be carried vertically in one column upon one set of pins (72), and the transfer of the platforms will be made at such speed as will place the platforms in condition to rest upon pins 72' in the opposite column, the complete transfer being made during the time that the next succeeding cage has traveled upwardly through a distance equal to one half of the height of the automobile or, in other words, one half the distance between platforms in the vertical columns.

It will be seen, therefore, that, in this embodiment of my invention, the platforms or load receptacles will be moved vertically at one speed and will be transferred from one column to the next at an increased rate of speed, thereby permitting the spacing of the load receptacles to be only that required for the actual height of machines stored thereon.

In Figs. 9, 10 and 11, I have illustrated a third form of my invention. In this case, the arrangement of load receptacles and chains is similar to that described with reference to the form of the invention shown in Figs. 1 to 5, inclusive.

Referring to Fig. 9, I have illustrated a plurality of load receptacles A', B', C', D', E' and F', each of which is attached to a pair of endless chains 110 and 111, by means of attaching pins 112 and 113, respectively, secured to the chains 110 and 111. One end of these pins acts as the interconnecting pin for the assembled links constituting the respective chains, while the other end of the pin projects inwardly toward the load receptacle for engagement within a slot 114 in an attaching member 115 secured, in any suitable manner, to the top frame member 116 of each of the load receptacles.

Referring to Fig. 10, it will be observed that the top frame member 116 has a platform 117 suspended therefrom, as by suitable structural-steel struts 118 and 119, the assembled structure constituting, in effect, a cage or load receptacle for the reception of an automobile to be stored.

The chains 110 and 111 extend through an endless path defined by sprocket wheels or sheave wheels 120, 121, 122 and 123, and may be driven through this path by suitable connection of a driving motor 124 geared to one of the sprockets (120), as by a belt or chain drive 125.

At the upper extremity of the housing structure defined by structural members 126, 127 and 128, I have illustrated a transfer arm 129 mounted in any suitable bearing member 130, secured, in any suitable way, to one of the structural members 127. The transfer arm 129 is arranged to be rotated upon its bearings 130 by means of suitable elliptical gearing devices 131 for the purpose of slowly accelerating the arm from a speed substantially equal to the speed of movement of the chain 110 to a speed considerably in excess of the speed of the chain and then to decelerate the arm to a speed corresponding again to the speed of the chain. The motive power for driving the movable arm 129 may be the same as that for driving the chain 110, and I have illustrated the connection of motor 124 to a gear or sprocket 132 by extending the chain 125 over this sprocket, as well as over the sprocket 120.

Referring to Fig. 10, it will be observed that the outer end of the transfer arm 129 moves in a plane parallel to the movement of the chain 110 in such way as to cause a pin 133 carried by the arm 129 to enter into the right-hand end of the slot 114 of the cage or platform-attaching member 115. Assuming that the position of the chain illustrated in Fig. 10 is that condition existing when the load receptacle is at the uppermost limit of travel of the chain 110, movement of the arm 129 in a clockwise direction will cause its pin 133 to enter into the slot 114 in the attaching member 115 and lift that end of the cage or platform off the pin 112.

It is assumed that a similar transfer arm 134 is mounted upon the opposite side of the storage structure for engagement with the attaching member 135 which carries the opposite end of the load receptacle, and that, at this time, the pin 136, carried by the arm 134, will engage the attaching member 135 and lift that end of the load receptacle from engagement with the pin 113.

As the transfer arms 129 and 134 continue their movement in a clockwise direction, the cage will be lifted along the arc indicated in dotted lines in Fig. 9 by the reference character 137, and the cage or platform will be transferred from the left-hand column to the right-hand column and will be set down in the new column to again engage pins 112 and 113, respectively.

It is understood that the relative speeds of movement of the chain 110 and the arm 129 will be such that, while the cage or platform is traveling through the arcuate path indicated by dotted line 137, the chain will have moved across the chord of that arc to the exact position necessary to bring the pins 112 and 113 ready to receive the attaching members 115 and 135 when the transfer arm has completed one half of its circular path of movement. In like manner, a transfer arm 138 is mounted at the lower limit of travel of the chain 110 to perform a similar transferring function for the cages when they reach the lower limit of travel. The lower transfer arm is illustrated as suitably geared to sprocket 123 by means of a chain 139 to drive a gear 140 and hence, through elliptical gearing 141 and 142, to produce a variable-speed rotary movement of the transfer arm 138.

It will be observed that, by virtue of the variable speed movement of the transfer arm 138, the right-hand end 143 will, at the beginning of the transfer movement, be travelling at a speed slightly less than the speed of movement of the chain 110. Hence, the movement of the chain 110 will cause the attaching member 115 to settle upon a pin 144 (corresponding to pin 133 on the arm 129) and the further movement of the chain will cause the pin 112 to move out of engagement with the attaching member 115. As the arm continues to swing downwardly, the chain 110 will change its direction from a vertical to a horizontal direction, as it passes around sprocket 133 with sufficient sharpness to move the pin 112 out of the way of the now descending attaching end member 115. As the arm 138 continues rotating, it will swing the cage through the arc indicated by dotted line 145 and will move the cage or platform to the position illustrated by the cage F' at such time as the pin 112 on the chain 110 will have moved to a position ready to re-engage the end member 115, and the deceleration of the arm 138, when in this position, will be arranged to be such that, while the arm 138 is substantially stationary, the movement of the chain 110 will cause the pin 112 to lift the receptacle or cage from the arm 138 and thence carry it vertically upwardly through the left-hand vertical rise of the conveyor system.

It will be observed that the transfer arms 129 and 138 are provided with pins at each of their respective ends so that a complete rotation of either of these transfer arms will result in the transfer of two of the cages from one of the columns to the opposite column.

By virtue of the foregoing construction, it will be observed that the cages may be attached to the chain in such relations as will eliminate any wasted space which would otherwise be necessary to permit the cages to pass each other during the transfer movement.

It will, therefore, be seen that I have provided mechanism for permitting the use of automobile storage devices of the endless-chain type in which substantially all of the volume of the storage structure may be effectively utilized for the storage of automobiles.

It is to be understood that the foregoing embodiments of my invention have been described in terms intended to be illustrative only and that I do not desire to be limited to any of the details shown and described herein except as defined in the appended claims.

I claim as my invention:

1. In an elevator system, means defining a pair of adjacent vertical columns interconnected at their respective ends, endless chains extending through the circuitous path defined by said columns each link of which comprises a plurality of laminations secured by a pin extending therethrough, a plurality of load receptacles, means for attaching each of said receptacles to said chains in spaced relation thereto, said attaching means being at right angles to the planes of movement of said chains and connecting to said chains to distribute the load on equal and opposite sides of the center of said pins, means for moving said endless chains to move said receptacles through said circuitous path with a continuous movement, whereby said receptacles will move through the vertical portions of the path at one speed and whereby the transfer of receptacles from either column to the other will be at an increased speed.

2. In an elevator system, means defining a pair of adjacent vertical columns interconnected at their respective ends, endless chains extending through the circuitous path defined by said columns each link of which comprises a plurality of laminations secured by a pin extending therethrough, a plurality of load receptacles, means for attaching each of said receptacles to said chains in spaced relation thereto, said attaching means being at right angles to the planes of movement of said chains, and connecting to said chains to distribute the load on equal and opposite sides of the center of said pins, means for guiding the outer ends of said pins, means for moving said endless chains to move said receptacles through said circuitous path with a continuous movement, whereby said receptacles will move through the vertical portions of the path at one speed and whereby the transfer of receptacles from either column to the other will be at an increased speed.

3. In a storage system, a building structure and a conveyor therein comprising a pair of endless flexible members disposed apart in parallel relation to each other, means attached to said building structure for supporting each of said endless flexible members, a plurality of load receptacles, a pair of relatively movable bracket arms for attaching one side of each receptacle directly to one of the endless flexible members, and a pair of relatively movable bracket arms for attaching another side of each receptacle directly to the other endless flexible member.

4. In a storage system, a building structure and a conveyor therein comprising a pair of endless flexible members disposed apart in parallel relation, said endless flexible members being movable synchronously in the same direction through two adjacent straight paths, means attached to said building structure for supporting each of said endless flexible members, a plurality of load receptacles, a pair of relatively movable bracket arms for attaching one side of each receptacle directly to one of the endless flexible members, and a pair of relatively movable bracket arms for attaching another side of each receptacle directly to the other endless flexible member, whereby gradual acceleration and deceleration in the speed of movement of the receptacles in transferring from one straight path to another is obtained.

5. In a storage system, a building structure and a conveyor therein comprising a pair of endless flexible members disposed apart in parallel relation, means attached to said building structure for supporting said pair of endless flexible members, a plurality of load receptacles, a pair of bracket arms for attaching one side of each receptacle to one of the endless flexible members, and a pair of bracket arms for attaching another side of each receptacle to the other endless flexible member, each of said pairs of bracket arms having its constituent arms disposed in an angular relation to each other, one end of one arm pivotally cooperating with the corresponding end of the other arm to constitute a pivotal support for one side of a receptacle, the other ends of the bracket arms being attached to one of the endless flexible members at different parts thereof.

6. In a storage system, a building structure and a conveyor therein comprising a pair of endless flexible members disposed apart in parallel relation to each other, means attached to said building structure for supporting said pair of endless flexible members, a plurality of load receptacles, a pair of bracket arms for attaching one side of each receptacle to one of the endless flexible members, and a pair of bracket arms for attaching another side of each receptacle to the other endless flexible member, each of said pairs of bracket arms having its constituent arms disposed in an angular relation to each other, one end of one arm pivotally cooperating with the corresponding end of the other arm to constitute a pivotal support for one side of a receptacle and the other end of each of the arms being attached to one of the endless flexible members at different parts thereof, the shortest distance from the pivotal connection of the two bracket arms to the endless flexible member to which they are attached being not greater than the distance between the parts of the endless flexible member at which the separate arms are attached.

7. In a storage system, a building structure, a conveyor therein comprising a pair of endless flexible members disposed apart in parallel relation to each other, means attached to said building structure for supporting each of said endless flexible members; a plurality of load receptacles, a supporting arm comprising a plurality of bracket arms for pivotally attaching one side of each of the receptacles to one endless flexible member of said pair, and a supporting arm comprising a plurality of bracket arms for pivotally attaching another side of each of the receptacles to the other endless flexible member of said pair.

8. In a storage system, a building structure, a conveyor therein comprising a pair of endless flexible members disposed apart in parallel relation to each other, means attached to said building structure for supporting each of said endless flexible members, a plurality of load receptacles, a supporting member comprising a plurality of bracket arms for pivotally attaching one side of each receptacle to one of the endless flexible members of said pair, and a supporting member comprising a plurality of bracket arms for pivotally attaching another side of each receptacle to the other endless flexible member of said pair, the plurality of arms comprising any one of said members for supporting and attaching one side of each receptacle to an endless flexible member being disposed into two groups, the separate bracket arms of each group being alined with each other and the two groups of arms being disposed at an angle to each other, corresponding ends of all the bracket arms being jointed together to constitute a pivotal joint for supporting one side of a receptacle, the opposite ends of the bracket arms of one group being attached to one section of the endless flexible member and the opposite ends of the bracket arms of the other group being attached to the same endless flexible member as the first mentioned group but at another section thereof.

9. In a storage system, a building structure, a conveyor therein comprising a pair of endless flexible members disposed apart in parallel relation to each other, means attached to said building structure for supporting each of said endless flexible members, a plurality of load receptacles, a supporting member comprising a plurality of bracket arms for pivotally attaching one side of each receptacle to one of the endless flexible members of said pair, and a supporting member comprising a plurality of bracket arms for pivotally attaching another side of each receptacle to the other endless flexible member of said pair, the plurality of arms comprising any one of said members for supporting and attaching one side of each receptacle to an endless flexible member being disposed into two groups, the separate bracket arms of each group being alined with each other and the two groups being disposed at an angle to each other, the corresponding ends of all the bracket arms being pivotally jointed together at one end to constitute a pivotal joint for supporting one side of a receptacle, the opposite ends of all the bracket arms in one group being pivotally attached to one section of one of the endless flexible members and the opposite ends of the bracket arms of the other group being pivotally attached to the same endless flexible member as the first mentioned group but to another section thereof, the two groups of arms comprising a supporting member being relatively movable whenever the distance between the places of attachment of the separate groups of arms to the endless flexible member changes.

10. In a storage system, a building structure, a conveyor therein comprising a pair of endless chains disposed apart in parallel relation to each other, means attached to said building structure for supporting each of the said endless chains, a plurality of load receptacles, a pair of bracket arms for pivotally attaching one side of each receptacle to one of the endless chains of said pair, a pair of bracket arms for pivotally attaching another side of each of the receptacles to the other endless chain of said pair, the separate bracket arms of each pair being disposed at an angle to each other, the one end of the one bracket arm pivotally cooperating with the corresponding end of the other bracket arm to constitute a pivotal joint for supporting one side of a receptacle, the opposite end of one bracket arm being pivotally attached to one link of said endless chain, and the opposite end of the other bracket arm being pivotally attached to another link of said endless chain.

11. In a storage system, a building structure, a conveyor therein comprising a pair of endless chains disposed apart in parallel relation to each other, means attached to said building structure for supporting each of the endless chains, a plurality of load receptacles, a pair of bracket arms for pivotally attaching one side of each receptacle to one of the endless chains of said pair, a pair of bracket arms for pivotally attaching another side of each of the receptacles to the other endless chain of said pair, the separate bracket arms of each pair being disposed at an angle to each other, the one end of the one bracket arm pivotally cooperating with the corresponding end of the other bracket arm to constitute a pivotal joint for supporting one side of a receptacle, the opposite end of the one bracket arm being pivotally attached to one link of said endless chain and the opposite end of the other bracket arm being pivotally attached to another link of said endless chain, a plurality of links of the endless chain being disposed between the links to which the bracket arms are attached.

12. In a storage system, a conveyor comprising a pair of endless flexible members disposed in spaced parallel relation, a plurality of load receptacles, and means for supporting said receptacles from said endless flexible members, said means comprising a bracket arm connecting one side of a receptacle to one endless flexible member and another bracket arm connecting another side of a receptacle to the other endless flexible member, said bracket arms being disposed to move in the plane of the endless flexible members to which they are connected.

13. In a storage system, a conveyor comprising a pair of endless flexible members disposed in spaced parallel relation, a plurality of load receptacles, and means for supporting said load receptacles from said endless flexible members, said means comprising a pair of relatively movable bracket arms for attaching one side of each receptacle to one of the endless flexible members and a pair of relatively movable bracket arms for attaching another side of each receptacle to the other endless flexible member, each of said pairs of relatively movable bracket arms being disposed for movement in the plane of their respectively associated endless flexible members.

14. In a storage system, a conveyor comprising a pair of endless flexible members disposed in spaced parallel relation, a plurality of load receptacles, means for supporting said load receptacles from said endless flexible members, said supporting means comprising a bracket arm for each receptacle for connecting one side thereof to one of the endless flexible members and a bracket arm for each of the receptacles for connecting another side thereof to the other endless flexible member, said bracket arms being disposed for movement in the plane of their respectively associated endless flexible members and outwardly therefrom whereby said receptacles are moved through a path greater in length than the path of movement of the endless flexible members.

15. In a storage system, a conveyor comprising a pair of endless flexible members disposed in spaced parallel relation, a plurality of load receptacles, means for supporting said load receptacles from said endless flexible members, said supporting means comprising a pair of relatively movable bracket arms for attaching one side of each receptacle to one of the endless flexible members, and a pair of relatively movable bracket arms for attaching another side of each receptacle to the other endless flexible member, each of said pairs of relatively movable bracket arms being disposed for movement in the plane of their respectively associated endless members and outwardly therefrom whereby the receptacles are moved through a path greater in length than the path of movement of the endless flexible members.

In testimony whereof I have hereunto subscribed my name this 3rd day of January 1929.

HENRY D. JAMES.